Sept. 20, 1960

G. P. JANKAUSKAS 2,953,413

ANTI-SKID BRAKE MECHANISM

Filed Dec. 10, 1958

INVENTOR
GEORGE PLATON JANKAUSKAS

BY
Morton, Bonow & Taylor
ATTORNEYS

Sept. 20, 1960

G. P. JANKAUSKAS 2,953,413

ANTI-SKID BRAKE MECHANISM

Filed Dec. 10, 1958

INVENTOR
GEORGE PLATON JANKAUSKAS

BY Pennie, Edmonds,
Morton, Barrows & Taylor
ATTORNEYS

Sept. 20, 1960

G. P. JANKAUSKAS 2,953,413

ANTI-SKID BRAKE MECHANISM

Filed Dec. 10, 1958

INVENTOR
GEORGE PLATON JANKAUSKAS

BY Dennis, Edmonds,
Morton, Borrows & Taylor
ATTORNEYS

United States Patent Office 2,953,413
Patented Sept. 20, 1960

2,953,413

ANTI-SKID BRAKE MECHANISM

George Platon Jankauskas, New York, N.Y., assignor to Walter A. Dubovick, Fords, and John P. Kozak, South River, N.J.

Filed Dec. 10, 1958, Ser. No. 779,425

3 Claims. (Cl. 303—24)

This invention relates generally to an anti-skid brake mechanism and more particularly to an anti-skid brake mechanism having inertia responsive characteristics in order that the mechanism may work properly over a variety of road conditions.

In my previously filed application Serial No. 432,525, filed May 26, 1954 now Patent No. 2,867,299, entitled "Anti-Skid Brake Mechanism," I disclosed an anti-skid mechanism which is generally similar to the presently proposed system but which operates slightly different therefrom.

My present mechanism comprises generally a control valve which is inserted in the hydraulic brake lines leading from the master cylinder to the rear braked wheels wherein the control valve comprises a piston controlled spring loaded check valve which, when open, permits flow of hydraulic fluid from the master cylinder to the rear wheel brake motors and which, when closed, shuts off such flow. The check valve is spring loaded to be normally open, but arranged to close through action of a control piston at a predetermined pressure. The control piston is movable back and forth in a control cylinder and is biased from a perforated piston which in turn is attached to a needle which holds the check valve open. The control piston is engaged on one side by a counter spring and an inertia operated plunger which tend to push the piston one way in the control cylinder, while the fluid pressure from the master cylinder opposes a spring and plunger to push the piston the other way in the control cylinder. The counter spring is pre-set so that the control piston will move against the force exerted by it and the inertia operated plunger when a predetermined hydraulic pressure exists in the control chamber. Movement of the piston will then allow the check valve to close. The predetermined hydraulic pressure is the maximum which can be applied to the rear wheel braked motors without having the wheels lock on an icy surface, an icy road surface being the road condition having the lowest coefficient of adhesion between a tire and the road surface.

The structure so far described in my present anti-skid mechanism is disclosed in my prior application. However, the plunger in my prior device is associated with a pendulum consisting of a weight eccentrically mounted on an arm which is spring biased so that the arm rests in a predetermined position in a vertical plane when the vehicle is neither accelerating nor decelerating.

My present control valve differs from the above described control valve in that the inertia means comprises a weight which may swing in a plane parallel to the road bed and which is spring biased by means of a return spring so that the plunger, which in my prior device was not continually in contact with the control piston, now continually engages the control piston.

The effect of having the plunger biased continually into contact with the control piston by means of the return spring is to keep open the check valve controlling flow of hydraulic fluid from the master cylinder to the rear braked wheels during initial braking of the vehicle. This results in that on a road having a high coefficient of friction, a dry road, the braking system of the vehicle will operate conventionally because the inertia means will be thrown forward and so will keep the check valve open, resulting in equal hydraulic pressure being applied to both the front and rear braked wheels during most of the braking of the vehicle. Less braking force will be exerted on the rear braked wheels only as the rear braked wheels near the locked state on a wet or icy road.

Referring to the drawings in which a preferred embodiment of my invention is illustrated both schematically and in detail, Fig. 1 is a schematic view of a vehicle having my novel anti-skid braking mechanism installation;

Figure 1:
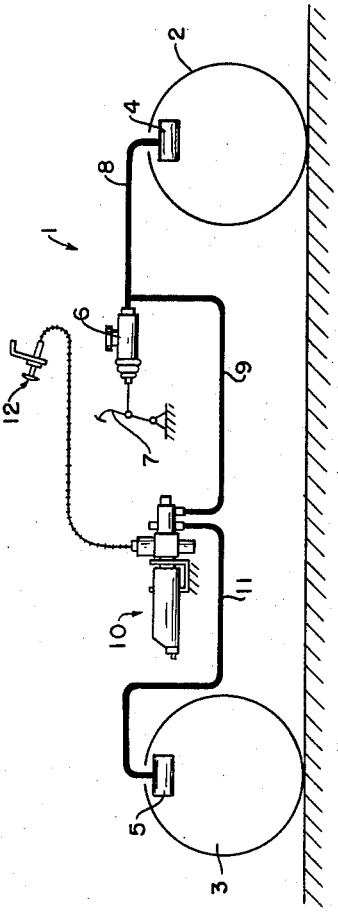

Referring to the drawings in detail, Fig. 1 illustrates a vehicle 1 having front braked wheels 2 and rear braked wheels 3. Associated with each of the braked wheels of the vehicle are braking motors 4 on the front braked wheels and 5 on the rear braked wheels. A master cylinder 6 which is operated by means of a foot pedal 7, has a conduit 8 leading to the front braking motors 4 and a conduit 9 leading to my novel anti-skid mechanism denoted generally by 10 through which hydraulic fluid may flow under pressure of pedal 7. Conduit 11 connects the anti-skid mechanism 10 with the rear braking motors 5 on each rear braked wheel. A control 12 is mounted on the dashboard of the vehicle for engaging and disengaging the anti-skid mechanism 10.

Figure 2:
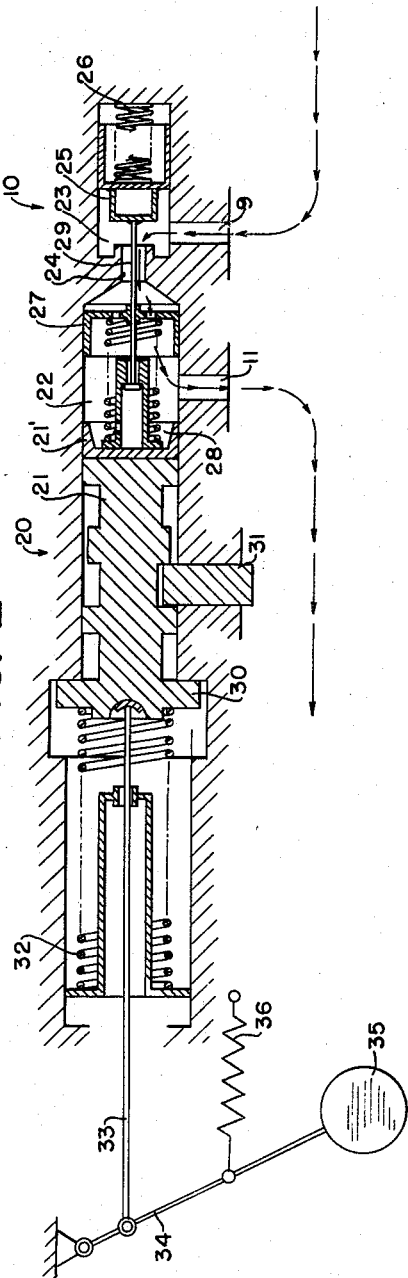
Fig. 2 is an enlarged plan schematic view of the control valve shown in Fig. 1 in the locked or inoperative position.

Referring to Fig. 2 there is shown schematically my novel anti-skid mechanism 10 which comprises generally a cylinder housing 20 which has therein a movable control piston 21 and which defines with the housing a control chamber 22. A piston seal 21' insures that hydraulic fluid will not leak by the pistons. Also contained in the cylinder housing 20 is an inlet chamber 23 which is connected to the control chamber by means of passage 24. A check valve 25 is biased by means of a check spring 26 towards the passage 24 so that under some operating conditions of the mechanism, the check valve will close passage 24 to prevent flow of hydraulic fluid to control chamber 22 from master cylinder 6.

A perforated piston 27 is also contained in control chamber 22 and is biased from control piston 21 by means of a separating spring 28. A needle 29 is attached to perforated piston 27 and extends through passage 24 to engage check valve 25 to keep the check valve open against the bias of spring 26 under certain operating conditions. Control piston 21 may be locked against movement in the cylinder housing 20 by means of a key 31, the operation of which is controlled by means of knob 12 mounted on the dashboard of the vehicle. Control piston 21 is biased towards the right as shown in Fig. 2 by means of a counter spring 32. Piston 21 is also engaged by an inertia operated plunger 33 which is connected to a swinging arm 34 having a weight 35 mounted on the end thereof. The plunger is held continually in contact with piston 21 by means of a return spring 36.

The mechanism is illustrated in Fig. 2 as being in the locked condition, that is, when the dashboard mounted control 12 is positioned so as to insure that key 31 locks the piston 21 against movement in the cylinder housing. It is seen in this view that separating spring 28 overcomes check valve spring 26 so that the check valve is in the open position resulting in that under all braking conditions the same braking force will be exerted by the master cylinder on both the front and rear braking motors associated with each braked wheel.

Figure 3:
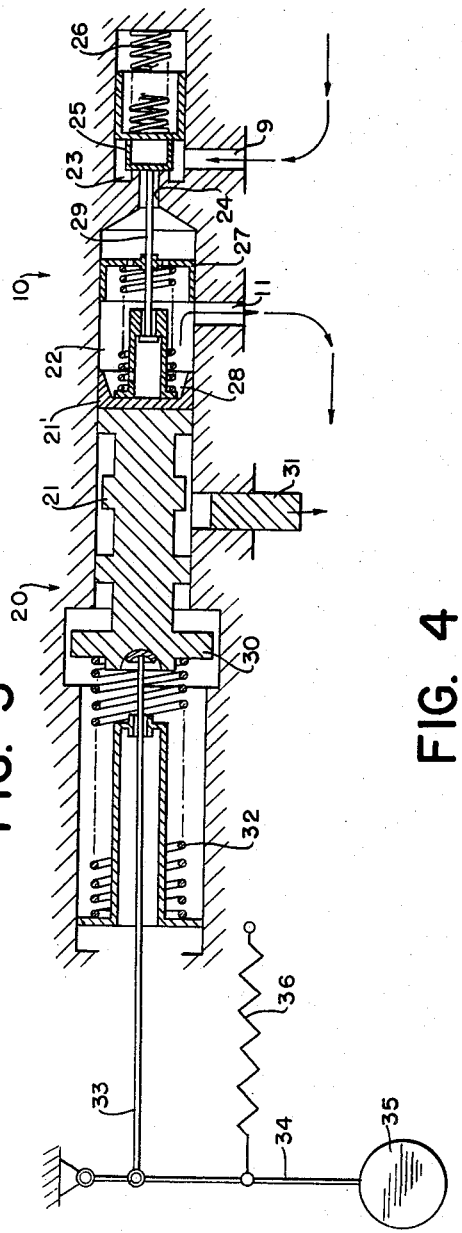
Fig. 3 is a view similar to Fig. 2 with the control valve in the unlocked position and illustrating the mechanism during braking on a wet road.

On a slippery road, the device is put into operation by pulling knob 12 mounted on the dashboard in order to remove key 31 so as to unlock piston 21. If the brakes are applied gently and the pressure in chamber 24 is below that necessary to move piston 21 to the left as shown in Fig. 3 against the force of counter spring 32, the inertia force of weight 35 and return spring 36, then braking action will be the same as in Fig. 2 wherein all of the braking motors associated with each braked wheel are receiving the same hydraulic pressure. If hydraulic pressure in chamber 22 is increased to that necessary to lock the rear wheels on a wet road by increasing pressure on the brake pedal 12, then the force of the hydraulic pressure acting on seal 21' will cause piston 21 to move to the left as shown in Fig. 3, against the bias of counter spring 32 and return spring 36. For this purpose the counter spring is pre-set so as to be overcome by the maximum hydraulic pressure in chamber 22 that will not cause locking of the rear wheels on a road surface having the lowest coefficient of adhesion, such as an icy road. This movement of the piston in turn will allow perforated piston 27 to move to the left along with the attached needle 29. Check valve spring 26 will then move the check valve 25 to the closed position so preventing any further increase in hydraulic pressure in chamber 22 notwithstanding braking pressure that might be exerted on the front braked wheels.

Figure 4:
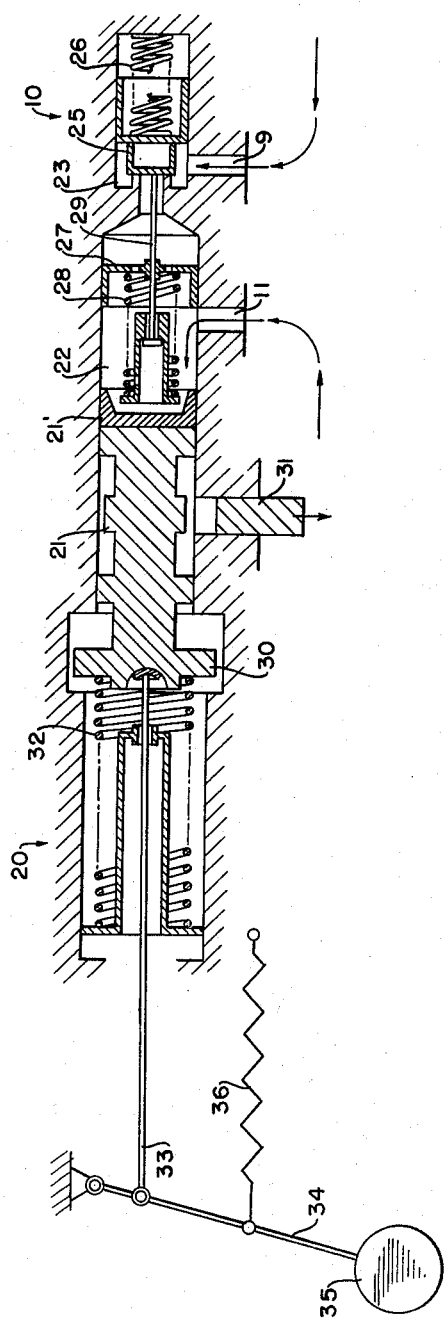
Fig. 4 is a view similar to Figs. 2 and 3 showing the mechanism during braking on an icy road surface having less adhesion than the road surface in Fig. 3.

If the vehicle then hits an icy section of the road having less adhesion than the wet surface, then less hydraulic pressure is needed in chamber 22 in order to prevent the rear wheels from skidding. Because the overall inertia force of the vehicle will decrease when it hits an icy spot, weight 35 will then swing rearward of the vehicle to allow pressure existing in the rear braked wheels and in chamber 22 to move piston 21 still further to the left as shown in Fig. 4, against the bias of counter spring 32 and return spring 36.

Figure 5:
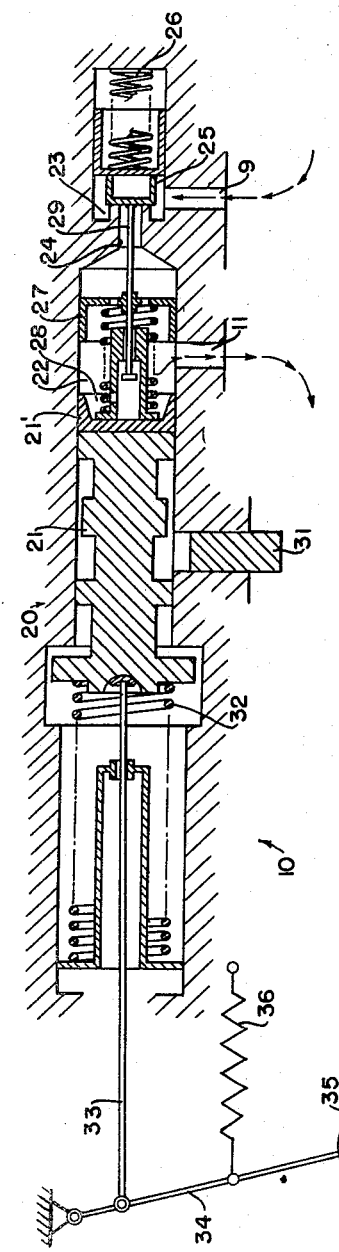
Fig. 5 is a view similar to Figs. 2, 3 and 4 showing braking mechanism on a road having a high adhesion surface, and, Fig. 6 is a detailed plan view of the control valve shown schematically in Fig. 1.

If the vehicle then hits a dry section of road, the inertia force will increase due to the higher coefficient of friction. This will cause weight 35 to swing forward as shown in Fig. 5, which in turn will cause plunger 33 to move to the right and force piston 21 also to move to the right, increasing hydraulic pressure in chamber 22 and the brake motors of the rear braked wheels. When the hydraulic pressure in chamber 22 equals that in chamber 23, check valve 25 will open since separating spring 28 is stronger than spring 26. The system will then again operate conventionally, that is, equal pressure will be applied to all braking wheel motors as shown in Fig. 2.

It is seen that the system is entirely automatic. That is to say, one hard application of the brake pedal will cause the brakes to operate conventionally up to a certain point. If the vehicle then hits a wet slippery spot, the system will come into operation to reduce hydraulic pressure on the rear braked wheels so that they will not lock. If the vehicle hits even a more slippery spot, such as an icy section of the road, still less braking force will be exerted on the rear braked wheels in order to insure that they will not lock. If the vehicle then runs on to a dry section of the road, the braking system will then automatically resume the conventional operation wherein the wheels will brake evenly.

Figure 6:
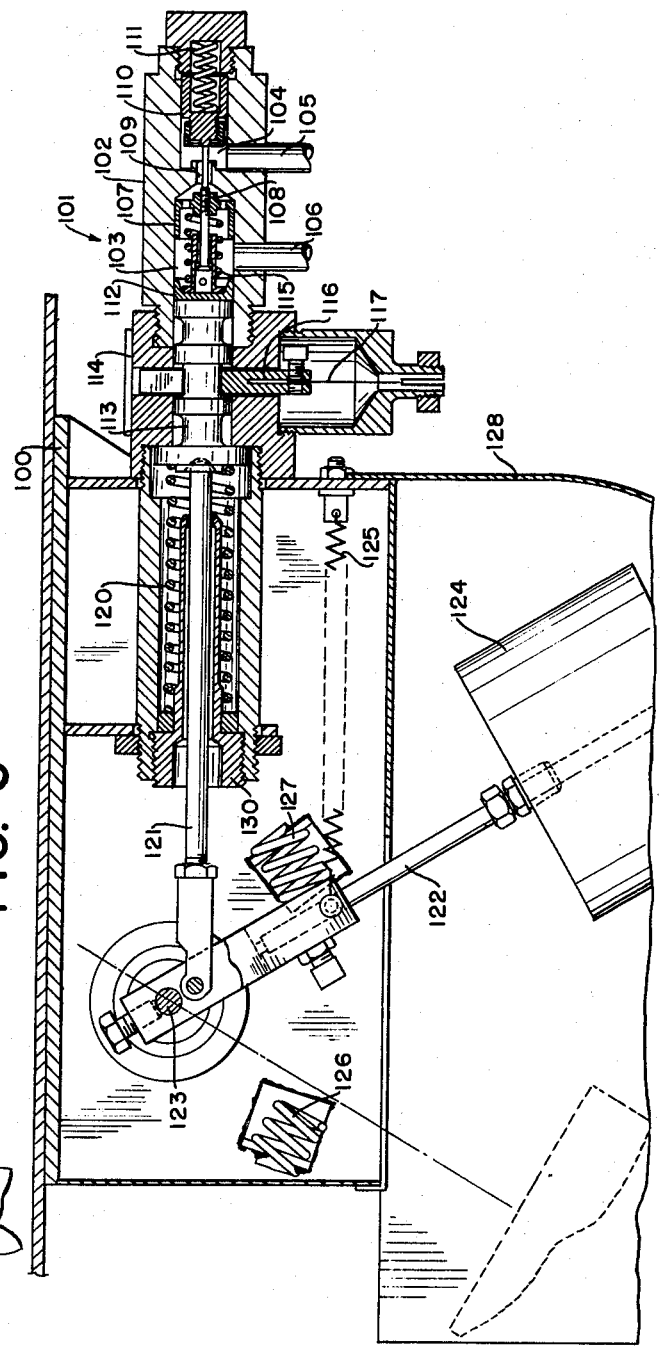

In Fig. 6, I illustrate a detailed drawing of my novel anti-skid mechanism which incorporates a swinging weight which differs from that disclosed in my prior application.

In that figure, 100 illustrates the vehicle frame to which a control valve denoted generally by 101, may be mounted. A chamber housing 102 has therein a control chamber 103 and an inlet chamber 104. Inlet chamber 104 has a conduit 105 which connects with the master cylinder, not shown, while control chamber 103 has a conduit 106 which connects to the motors of the rear braked wheels, not shown. Chamber 103 has movable therein a perforated piston 107 to which is connected a needle 108 which extends into passage 109 connecting chambers 103 and 104. Needle 108 bears on a check valve 110 which is biased towards the needle and passage by means of a check valve spring 111.

Forming one end of chamber 103 is a piston seal 112 which bears on a piston 113 slidable in housing 114. Piston seal 112 is biased away from perforated piston 107 by means of a spring 115. Separating spring 115 is of greater strength than check valve spring 111.

A forked key 116 extends through housing 114 to lock piston 113 against movement. Key 116 is connected by means of a cable 117 to a control on the dashboard, not shown. Engaging the end of piston 113 is a counter spring 120 which biases the piston 113 to the right as shown in the drawing. Counter spring 120 is of greater strength than separating spring 115.

An inertia operated plunger 121 bears against piston 113 and is connected to an arm 122 which pivots about point 123. A weight 124 is carried on the end of the arm 122. Plunger 121 is kept in continual engagement with piston 113 by means of a return spring 125.

Cushion springs 126 and 127 serve to cushion arm 122 against violent movements. The whole arm and weight assembly is enclosed by means of a cover 128 to insure that dirt, mud and the like will be kept away from the swinging arm of the weight which might affect its movement.

The swinging arm and weight are mounted in a horizontal plane and because plunger 121 is kept in continual contact with piston 113 by means of spring 125, the arm will be kept forward when the vehicle is sloped forward such as when going down a hill. Spring 125 is of such sufficient strength to still keep the plunger in contact with the piston even though the vehicle is going up a hill which would tend to move weight 124 to the left as shown in Fig. 6.

It should be noted that the normal down-hill slope of a roadway for example, a 5% slope, will have a negligible effect upon the operation of my device when in the unlocked position because the normal rate of brake-induced deceleration is much higher than the normal down-hill slope. If however, the slope of a road is high, such as 25% or more, the control valve in the unlocked position will always be in a normal braking position because the weight 124 will be held forward by spring 125, plus the effect of gravity acting on the weight tending to swing it forward due to the downhill slope.

It is also possible that on a dry road the available adhesion will be of such an amount that the movement of the weight 124 will cause a higher pressure to exist in the control chamber than is called for by the degree of brake pressure exerted by the driver. This would occur in the case of a light or gradual stop on a surface of high adhesion. In such a case the needle 108 will keep the check valve 110 open and thus the check valve will automatically connect the rear wheel brake cylinders to the master cylinder. In this particular instance the device will operate in a conventional manner.

The anti-skid protection offered by my invention extends to operation of a vehicle over patch ice surfaces. This is because, although both front wheels may be locked, the weight 124 will sense the arithmetical average coefficient of friction being encountered by both front wheels. For instance, assume the right front wheel is running on ice and the left front wheel on a dry surface. Assume further that the former is retarding at a fraction of .1 and the latter at .8. The average under these conditions is .45, which means that both rear wheels are retarding at .45. This in turn signifies that the right rear wheel, running on ice, is locked but that the left rear wheel running on a dry surface is in a rotating retarded state. It is this one rotating wheel which prevents the vehicle from going into a lateral skid or spin and at the same time induces it to seek a higher safer coefficient for all 4 wheels.

Counter spring 120 is pre-set so as to be overcome when the hydraulic pressure in chamber 103 is sufficient to cause locking of the rear wheels on an icy road surface. Adjustments to the setting of spring 120 may be made by nut 130.

The device is further provided with a bleeder valve, not shown, at the top of the control chamber in order that air may be bled out of the control valve during process of installation.

My novel anti-skid brake mechanism may be easily installed on vehicles in present day use since it merely must be inserted between the master cylinder and braking motors of the rear braked wheels.

Having thus described my invention, what I claim is:

1. In a fluid pressure brake system for a wheeled vehicle having front braked wheels on at least one front axle and rear braked wheels on at least one rear axle: fluid pressure operated braking motors for each braked wheel; a master cylinder; means for increasing fluid pressure in said master cylinder; conduits for transmitting fluid under pressure from said master cylinder to said motors; a spring loaded check valve, the check spring of which biases said valve to a closed position, said check valve being located in said conduits between said master cylinder and the motors associated with the rear braked wheels; a control chamber in communication with the rear wheel motors; a control piston in said control chamber; a needle in said control chamber bearing on said check valve; a separating spring stronger than said check spring biasing said needle away from said control piston; a counter spring stronger than said separating spring biasing said control piston towards said first needle to hold said check valve open when pressure in said control chamber is insufficient to move said control piston against the bias of said counter spring; an inertia operated plunger engaging said piston to move said piston against the bias of said separating spring to increase pressure to the rear wheel motors when said check valve is closed; and a return spring for holding said inertia operated plunger into continual engagement with said control piston; said check valve being closed when pressure in said control chamber reaches the set pressure of said counter spring and said return spring and causes said control piston to move away from said check valve to allow said check valve to close under the force of said check spring, and said check valve being open when the force of hydraulic pressure in said control chamber acting on one side of said check valve is equal to the force of hydraulic pressure in said master cylinder plus the force of said check spring acting on the other side of said check valve.

2. A braking system according to claim 1 having in addition inertia means comprising an arm rotatable about one of its ends; and a weight mounted on the other of its ends; said inertia operated plunger being connected to said arm at a point between said weight and said end about which said arm rotates and said arm and weight rotating about said end in a plane parallel to the path of said vehicle.

3. In a hydraulic braking system of a wheeled vehicle having a braked wheel on at least one front and one rear axle; a braking motor for each of said braked wheels; a master cylinder; hydraulic conduits connecting said master cylinder to each of said braking motors; and a pressure operated variable control valve assembly interposed in the hydraulic conduits leading from said master cylinder to each of said motors associated with a rear braked wheel; said pressure operated control valve comprising a housing; a control chamber in said housing in communication with each of said braking motors associated with a rear braked wheel, an inlet chamber in communication with said master cylinder, a check valve in said inlet chamber for closing off communication of the rear wheel brake motors from said master cylinder, a control piston in said control chamber adapted to move away from said check valve in response to hydraulic pressure in said control chamber, a needle in said control chamber bearing on said valve, a separating spring biasing said needle from said control piston, a counter spring opposing movement of said control piston away from said check valve, inertia responsive means for moving said control piston towards said needle and check valve to the open position and a return spring means for continually urging said inertia responsive means into contact with said control piston.

References Cited in the file of this patent

UNITED STATES PATENTS 2,867,299    Jankauskas _____ Jan. 6, 1959